US006282299B1

(12) United States Patent
Tewfik et al.

(10) Patent No.: US 6,282,299 B1
(45) Date of Patent: *Aug. 28, 2001

(54) METHOD AND APPARATUS FOR VIDEO WATERMARKING USING PERCEPTUAL MASKS

(75) Inventors: Ahmed H. Tewfik, Edina; Mitchell D. Swanson, Minneapolis; Bin Zhu, St. Paul, all of MN (US)

(73) Assignee: Regents of the University of Minnesota, Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 08/918,125

(22) Filed: Aug. 27, 1997

Related U.S. Application Data

(60) Provisional application No. 60/024,979, filed on Aug. 30, 1996, and provisional application No. 60/050,587, filed on Jun. 24, 1997.

(51) Int. Cl.[7] .................................................. G06K 9/00
(52) U.S. Cl. ............................................................ 382/100
(58) Field of Search .................................... 382/100, 232, 382/260; 380/210, 287, 54, 252; 370/527, 529; 713/176

(56) References Cited

U.S. PATENT DOCUMENTS

| | | | |
|---|---|---|---|
| 3,395,024 | 7/1968 | Earle | 99/169 |
| 4,313,197 | 1/1982 | Maxemchuk | 370/111 |

(List continued on next page.)

FOREIGN PATENT DOCUMENTS

| | | | |
|---|---|---|---|
| 0581317 | 2/1994 | (EP) | G07D/7/00 |
| 0 635 798 | 1/1995 | (EP) | G06F/17/30 |
| 0635798 | 1/1995 | (EP) | G06F/17/30 |
| 0 657 831 | 6/1995 | (EP) | G06F/17/30 |
| 0657831 | 6/1995 | (EP) | G06F/17/30 |
| 07-160731 | 6/1995 | (JP) | G06F/17/30 |

OTHER PUBLICATIONS

Ohnishi, J., et al., "Embedding a seal into a picture under orthogonal wavelet transform", IEEE Pro. 3rd Int. Conf. on Multimedia Computing & Systems, 514–521, (Jun. 17–23, 1996).

Szepanski, "Additive Binärdatenübertragung Für Videosignale," *NTG–Fachberichte*, vol. 74, 1980, pp. 343–351 (in German with English translation).*

Cox et al., "Secure Spread Spectrum Watermarking for Multimedia," NEC Research Institute, Technical Report 95–10, Dec. 1995, pp. 1–33.*

(List continued on next page.)

*Primary Examiner*—Andrew W. Johns
(74) *Attorney, Agent, or Firm*—Schwegman, Lundberg, Woessner & Kluth, P.A.

(57) ABSTRACT

A method and apparatus for the watermarking of video data is disclosed. In one embodiment, discrete objects are extracted from the video host data. Each is assigned and embedded with a watermark. The watermark is embedded by generating the watermark, applying it to a perceptual mask of the block, spatially masking the resulting block, and re-adding the block to the result. The objects are collected into a database so that an object may be tracked as it is transformed from frame to frame of the video host data.

11 Claims, 3 Drawing Sheets

U.S. PATENT DOCUMENTS

| | | | |
|---|---|---|---|
| 4,425,661 | 1/1984 | Moses et al. | 375/1 |
| 4,495,620 | 1/1985 | Steele et al. | 370/118 |
| 4,969,041 | 11/1990 | O'Grady et al. | 358/142 |
| 5,010,405 | 4/1991 | Schreiber et al. | 358/141 |
| 5,060,262 | 10/1991 | Bevins, Jr. et al. | 380/19 |
| 5,285,498 | 2/1994 | Johnston | 381/2 |
| 5,315,098 | 5/1994 | Tow | 235/494 |
| 5,319,735 | 6/1994 | Preuss et al. | 395/2.14 |
| 5,325,290 | 6/1994 | Cauffman et al. | 364/401 |
| 5,379,345 | 1/1995 | Greenberg | 380/23 |
| 5,386,240 | 1/1995 | Hori | 348/473 |
| 5,404,377 | 4/1995 | Moses | 375/200 |
| 5,450,490 | 9/1995 | Jensen et al. | 380/6 |
| 5,461,426 | 10/1995 | Limberg et al. | 348/475 |
| 5,465,269 | 11/1995 | Schaffner et al. | 375/200 |
| 5,465,308 | 11/1995 | Hutcheson et al. | 382/159 |
| 5,473,631 | 12/1995 | Moses | 375/202 |
| 5,515,296 | 5/1996 | Agarwal | 364/514 R |
| 5,530,759 | 6/1996 | Braudaway et al. | 380/54 |
| 5,579,471 | 11/1996 | Barber et al. | 395/326 |
| 5,583,941 | 12/1996 | Yoshida et al. | 380/51 |
| 5,606,609 | 2/1997 | Houser et al. | 380/4 |
| 5,613,004 | 3/1997 | Cooperman et al. | 380/28 |
| 5,646,997 | 7/1997 | Barton | 380/23 |
| 5,687,236 | 11/1997 | Moskowitz et al. | 380/28 |
| 5,710,719 | 1/1998 | Houle | 364/514 R |
| 5,710,916 | 1/1998 | Barbaraet et al. | 395/609 |
| 5,809,139 | 9/1998 | Girod et al. | 380/5 |
| 5,848,155 | 12/1998 | Cox | 380/4 |
| 5,850,481 | 12/1998 | Rhoads | 382/232 |
| 5,859,920 | 1/1999 | Daly et al. | 382/115 |
| 5,905,819 | 5/1999 | Daly | 382/284 |
| 5,930,369 | 7/1999 | Cox et al. | 380/54 |
| 6,031,914 | * 2/2000 | Tewfik et al. | 380/54 |

OTHER PUBLICATIONS

Podilchuk et al., "Digital Image Watermarking Using Visual Models," Proc. IS&T/SPIE Human Vision and Electronics Imaging II, Feb. 9–14, 1997, pp. 100–111.*

Tao et al., "Adaptive Watermarking in the DCT Domain," Proc. IEEE Int. Conf. on Acoustics, Speech and Signal Processing, Apr. 21–24, 1997, pp. 2985–2988.*

Swanson et al., "Object–based Transparent Video Watermarking," Proc. IEEE 1st Workshop on Multimedia Signal Processing, Jun. 23–25, 1997, pp. 369–374.*

Aizawa, K., "Model–Based Image Coding", Proceedings, SPIE Visual Communications and Image Processing '94, 2308, Chicago, IL, 1035–1049, (Sep. 25–29, 1994).

Baritaud, T., et al., "On the Security of the Permuted Kernel Identification Scheme", Proceedings of the 12th Annual International Cryptology Conference, Advances in Cryptology—CRYPTO '92, Brickell, E.F., (ed.), Santa Barbara, CA, 306–311, (Aug. 16–20, 1992).

Bender, W., et al., "Techniques for Data Hiding", IBM Systems Journal, 15 (3 & 4), 313–336, (1996).

Bender, W., et al., "Techniques for Data Hiding", SPIE, 2420, 164–173, (1995).

Boland, F.M., et al., "Watermarking Digital Images for Copyright Protection", IEEE International Conference on Image Processing and Its Applications, Edinburgh, Scotland, 326–330, (Jul. 4–6, 1995).

Boney, L., et al., "Digital Watermarks for Audio Signals", Proceedings of the IEEE International Conference on Multimedia Computing Systems, Hiroshima, Japan, 473–480, (Jun. 1996).

Bors, A.G., et al., "Image Watermarking Using DCT Domain Constraints", Proceedings of the IEEE International Conference on Image Processing, III, Lausanne, Switzerland, 231–234, (Sep. 16–19, 1996).

Bouman, C., et al., "Multiple Resolution Segmentation of Textured Images", IEEE Transactions on Pattern Analysis and Machine Intelligence, 13 (2), 99–113, (Feb. 1991).

Cawkell, A.E., "Picture–Queries and Picture Databases", Journal of Information Science, 19, 409–423, (1993).

Chalom, E., et al., "Segmentation of an Image Sequence Using Multi–Dimensional Image Attributes", Proceedings of the IEEE International Conference on Image Processing, II, Lausanne, Switzerland, 525–528, (Sep. 16–19, 1996).

Chan, W., et al., "Generalized Product Code Vector Organization: A Family of Efficient Techniques for Signal Compression", Digital Signal Processing, 4, 95–126, (1994).

Chang, S., et al., "Transform Coding of Arbitrarily–Shaped Image Segments", ACM Multimedia 93 Proceedings, Anaheim, CA, 83–90, (Aug. 1–6, 1993).

Chang, S.–., "Compressed–Domain Techniques for Image/Video Indexing and Manipulation", Proceedings of the 1995 International Conference on Image Processing, 1, Washington, D.C., 314–317, (Oct. 23–26, 1995).

Chitprasert, B., et al., "Human Visual Weighted Progressive Image Transmission", IEEE Transactions on Communications, 38 (7), 1040–1044, (Jul. 1990).

Corset, I., et al., "MPEG–4: Very Low Bit Rate Coding for Multimedia Applications", SPIE Proceedings, 2308, Visual Communications and Image Processing '94, Chicago, IL, 1065–1073, (Sep. 25–29, 1994).

Cox, I.J. et al., "Secure Spread Spectrum Watermarking for Images, Audio and Video", Proceedings of the IEEE International Conference on Image Processing, III, Lausanne, Switzerland, 243–246, (Sep. 16–19, 1996).

Craver, S., et al., "Can Invisible Watermarks Resolve Rightful Ownership?", IBM Research Report, RC 20509, 23 p., (Jul. 25, 1996).

Daubechies, I., et al., "Orthonormal Bases of Compactly Supported Wavelets", Communications on Pure and Applied Mathematics, XLI (7), 909–997, (Oct. 1988).

Faloutsos, C., et al., "Signature Files: An Access Method for Documents and Its Analytical Performance Evaluation", ACM Transactions on Office Information Systems, 2 (4), Research Contributions, 267–288, (Oct. 1984).

Flickner, M., et al., "Query by Image and Video Content: The QBIC System", Computer, 28, Theme Feature, 23–32, (Sep. 1995).

Gary, J.E., et al., "Shape Similarity–Based Retrieval in Image Database Systems", SPIE Proceedings on Image Storage and Retrieval Systems, 1662, San Jose, CA, 2–8, (Feb. 13–14, 1992).

Girod, B., "The Information Theoretical Significance of Spatial and Temporal Masking in Video Signals", SPIE Proceedings on Human Vision, Visual Processing and Digital Display, 1077, 178–187, (1989).

Gruber, J., "Smart Paper", Wired, 2,12, 1 p., (Dec. 1994).

Gudivada, V.N., et al., "Content–Based Image Retrieval Systems", Computer, 28, 18–22, (Sep. 1995).

Hartung, F., et al., "Digital Watermarking of Raw and Compressed Video", SPIE, 2952, 205–213, (Oct. 1996).

Hirata, K., et al., "Rough Sketch–Based Image Information Retrieval", NEC Research & Development, 34 (2), 263–273, (Apr. 1993).

Hirotsugu, K., "An Image Digital Signature System with ZKIP for the Graph Isomorphism", Proceedings of the IEEE International Conference on Image Processing, III, Lausanne, Switzerland, 247–250, (Sep. 16–19, 1996).

Hsu, C., et al., "Hidden Signatures in Images", Proceedings of the IEEE International Conference on Image Processing, III, Lausanne, Switzerland, 223–226, (Sep. 16–19, 1996).

Huang, Z., et al., "Affine–Invariant B–Spline Moments for Curve Matching", *IEEE Transactions on Image Processing*, 5 (10), 1471–1480, (Oct. 1996).

Huffman, D.A., "A Method for the Construcion of Minimum–Redundancy Codes", Proceedings of the Institute of Radio Engineers, Inc., 40, 1098–1101, (1952).

Jacobs, C.E., et al., "Fast Multiresolution Image Querying", Proceedings of the ACM SIGGRAPH Conference on Computer Graphics, Los Angeles, CA, 277–286, 10 p., (1995).

Jayant, N., et al., "Signal Compression Based on Models of Human Perception", Proceedings of the IEEE, 81 (10), 1385–1422, (Oct. 1993).

Johnston, J.D., et al., "Wideband Coding—Perceptual Considerations for Speech and Music", *Advances in Speech Signal Processing*, Furui, S., et al., (eds.), Dekker, New York, 109–140, 1992).

Le Gall, D., "MPEG: A Video Compression Standard for Multimedia Applications", *Communications of the ACM*, 34 (4), 46–58, (Apr. 1991).

Legge, G.E., et al., "Contrast Masking in Human Vision", *J. Optical Society of America*, 70 (12), 1458–1471, (Dec. 1980).

Lin, H., et al., "Color Image Retrieval Based on Hidden Markov Models", Proceedings of the 1995 IEEE International Conference on Image Processing, 1, Washington, D.C., 342–345, (1995).

Macq, B.M., et al., "Cryptology for Digital TV Broadcasting", Proceedings of the IEEE, 83 (6), 944–957, (Jun. 1995).

Manjunath, B.S., et al., "Browsing Large Satellite and Aerial Photographs", Proceedings of the IEEE International Conference on Image Processing, II, Lausanne, Switzerland, 765–768, (Sep. 16–19, 1996).

Matsui, K., et al., "Video–Steganography: How to Secretly Embed a Signature in a Picture", IMA Intellectual Property Project Proceedings on Technological Strategies for Protecting Intellectual Property in the Networked Multimedia Environment, vol. 1, Iss. 1, 187–206, (Jan. 1994).

Nam, J., et al., "Combined Audio and Visual Streams Analysis for Video Sequence Segmentation", 1997 IEEE International Conference on Acoustics, Speech and Signal Processing, IV, Munich, Germany, 2665–2668, (Apr. 21–24, 1997).

Niblack, W., et al, "The QBIC Project: Querying Images by Content Using Color, Texture and Shape", SPIE Proceedings, Storage and Retrieval for Image and Video Databases, 1908, 173–187, (1993).

Nill, N.B., "A Visual Model Weighted Cosine Transform for Image Compression and Quality Assessment", IEEE Transactions on Communications, COM–33 (6), 551–557, (Jun. 1985).

Noll, P., "Wideband Speech and Audio Coding", *IEEE Communications Magazine*, 31, Audio Applications, 34–44, (Nov. 1993).

O Ruanaidh, J., et al., "Phase Watermarking of Digital Images", Proceedings of the IEEE International Conference on Image Processing, III, Lausanne, Switzerland, 239–242, (Sep. 16–19, 1996).

Pitas, I., "A Method for Signature Casting on Digital Images", Proceedings of the IEEE International Conference on Image Processing, III, Lausanne, Switzerland, 215–218, (Sep. 16–19, 1996).

Rioul, O., et al., "Wavelets and Signal Processing", *IEEE Signal Processing Magazine*, 8, 14–38, (Oct. 1991).

Rivest, R.L., "Cryptography", *Handbook of Theoretical Computer Sciences*, A (13), Van Leeuwen, J., (ed.), 717–755, (1990).

Rivest, R.L., et al., "A Method for Obtaining Digital Signatures and Public–Key Cryptosystems", *Communications of the ACM*, 21 (2), Programming Techniques, 120–126, (Feb. 1978).

Smith, J.P., "Authentication of Digital Medical Images with Digital Signature Technology", *Radiology*, 194, Computer Applications, 4 p., (Mar. 1995).

Smith, J.R., et al., "Modulation and Information Hiding in Images", Information Hiding, Proceedings of the First International Workshop, Anderson, R., (ed.), Cambridge, U.K., 207–226, (May/Jun. 1996).

Srihari, R.K., "Combining Text and Image Information in Content–Based Retrieval", Proceedings of the 1995 IEEE International Conference on Image Processing, I, Washington, D.C., 326–328, (Oct. 23–26, 1995).

Strang, G., "Wavelets and Dilation Equations: A Brief Introduction", Society for Industrial and Applied Mathematics Review, 31 (4), 614–627, (Dec. 1989).

Swain, M.J., et al., "Color Indexing", International Journal of Computer Vision, 7 (1), Kluwer Academic Publishers, Manufactured in The Netherlands, 11–32, (1991).

Tanaka, K., et al., "Embedding Secret Information into a Dithered Multi–Level Image", A New Era: IEEE Military Communications Conference, 1, Monterey, CA, 216–220, (Sep. 30–Oct. 3, 1990).

van Schyndel, R.G., et al., "A Digital Watermark", Proceedings of the ICIP–94, II, Austin, TX, 86–90, (Nov. 13–16, 1994).

Voyatzis, G., et al., "Applications of Toral Automorphisms in Image Watermarking", Proceedings of the IEEE International Conference on Image Watermarking, II, Lausanne, Switzerland, 237–240, (Sep. 16–19, 199).

Wallace, G.K., "The JPEG Still Picture Compression Standard", *Communications of the ACM*, 34, 30–44, (Apr. 1991).

Witten, I.H., et al., "Arithmetic Coding for Data Compression", *Communications of the ACM*, 30 (6), 520–540, (Jun. 1987).

Wolfgang, R.B., et al., "A Watermark for Digital Images", Proceedings of the IEEE International Conference on Image Processing, III, Lausanne, Switzerland, 219–222, (Sep. 16–19, 1996).

Wunsch, P., et al., "Wavelet Descriptors for Multiresolution Recognition of Handprinted Characters", *Pattern Recognition*, 28 (8), 1237–1249, (Aug. 1995).

Zhu, B., et al., "Image Coding with Mixed Representations and Visual Masking", Proceedings of the 1995 International Conference on Acoustic, Speech and Signal Processing, 4, Detroit, MI, 2327–2330, (May 9–12, 1995).

Zhu, B., et al., "Low Bit Rate Near–Transparent Image Coding", Proceedings of the SPIE International Conference on Wavelet Applications for Dual Use, 2491, Orlando, FL, 173–184, (1995).

Zhu, S.C., et al., "Region Competition: Unifying Snakes, Region Growing, Energy/Bayes/MDL for Multi-band Image Segmentation", Proceedings of the Fifth International Conference on Computer Vision, Massachusetts Institute of Technology, Cambridge, MA, 416–423, (Jun. 20–23, 1995).

Ziv, J., et al., "A Universal Algorithm for Sequential Data Compression", IEEE Transactions on Information Theory, IT–23 (3), 337–343, (May 1977).

Cawkell, A.E., "Picture–Queries and Picture Databases", *The Journal of Information Science,* 19, 409–423 (1993).

Chang, S.–F., "Compressed–Domain Techniques for Image/Video Indexing and Manipulation", Proceedings of the 1995 IEEE International Conference on Image Processing, vol. 1, Washington, D.C., 314–317 (Oct. 23–26, 1995).

Chang, S.–F., et al., "Transform Coding of Arbitrarily–Shaped Image Segments", Proceeding sof the ACM, Multimedia 93, Anaheim, CA, 83–90 (Aug. 1–6, 1993).

Noll, P., "Wideband Speech and Audio Cloning", *IEEE Communications Magazine,* 31, 34–44 (Nov. 1993).

O'Ruanaidh, J.J.K., et al., "Phase Watermarking of Digital Images", Proceedings of the 1996 IEEE International Conference on Image Processing, vol. III, Lausanne, Switzerland, 239–242 (Sep. 16–19, 1996).

Swain, M.J., et al., "Color Indexing", *International Journal of Computer Vision,* 7, 11–32 (1991).

* cited by examiner

METHOD AND APPARATUS FOR VIDEO WATERMARKING USING PERCEPTUAL MASKS

RELATED DOCUMENTS

This application claims the benefit of U.S. Provisional Application No. 60/024,979, filed Aug. 30, 1996, which is hereby incorporated by reference. U.S. Provisional Application No. 60/050,587, filed Jun. 24, 1997, the benefit of which is also claimed, is also hereby incorporated by reference. Co-filed applications entitled "Method and Apparatus for Embedding Data, Including Watermarks, in Human Perceptible Sounds," "Method and Apparatus for Embedding Data, Including Watermarks, in Human Perceptible Images," and "Method and Apparatus for Scene-Based Video Watermarking," and "Digital Watermarking to Resolve Multiple Claims of Ownership," are also hereby incorporated by reference.

STATEMENT REGARDING GOVERNMENT RIGHTS

The present invention was made with government support by AFOSR under grant AF/F49620-94-1-0461, by ARPA under grant AF/F49620-93-1-05 and by NSF grant INT-9406954. The Government has certain rights in this invention.

FIELD OF THE INVENTION

This invention relates generally to techniques for embedding data such as watermarks, signatures and captions in digital data, and more particularly to watermarks in digital data that relates to video.

BACKGROUND OF THE INVENTION

Digital video is readily reproduced and distributed over information networks. However, these attractive properties lead to problems enforcing copyright protection. As a result, creators and distributors of digital video are hesitant to provide access to their digital intellectual property. Digital watermarking has been proposed as a means to identify the owner and distribution path of digital data. Digital watermarks address this issue by embedding owner identification directly into the digital data itself. The information is embedded by making small modifications to the pixels in each video frame. When the ownership of a video is in question, the information can be extracted to completely characterize the owner or distributor of the data.

Video watermarking introduces issues that generally do not have a counterpart in images and audio. Video signals are highly redundant by nature, with many frames visually similar to each other. Due to large amounts of data and inherent redundancy between frames, video signals are highly susceptible to pirate attacks, including frame averaging, frame dropping, interpolation, statistical analysis, etc. Many of these attacks may be accomplished with little damage to the video signal. A video watermark must handle such attacks. Furthermore, it should identify any image created from one or more frames in the video.

Furthermore, to be useful, a watermark must be perceptually invisible, statistically undetectable, robust to distortions applied to the host video, and able to resolve multiple ownership claims. Some watermarking techniques modify spatial/temporal data samples, while others modify transform coefficients. A particular problem afflicting all prior art techniques, however, is the resolution of rightful ownership of digital data when multiple ownership claims are made, i.e., the deadlock problem. Watermarking schemes that do not use the original data set to detect the watermark are most vulnerable to deadlock. A pirate simply adds his or her watermark to the watermarked data. It is then impossible to establish who watermarked the data first.

Watermarking procedures that require the original data set for watermark detection also suffer from deadlocks. In such schemes, a party other than the owner may counterfeit a watermark by "subtracting off" a second watermark from the publicly available data and claim the result to be his or her original. This second watermark allows the pirate to claim copyright ownership since he or she can show that both the publicly available data and the original of the rightful owner contain a copy of their counterfeit watermark.

There is a need, therefore, for watermarking procedures applicable to video digital data that do not suffer from the described shortcomings, disadvantages and problems.

SUMMARY OF THE INVENTION

The above-identified shortcomings, disadvantages and problems found within the prior art are addressed by the present invention, which will be understood by reading and studying the following specification. The invention provides for the watermarking of video data.

In one embodiment of the invention, discrete objects are extracted from video host data that is made up of a number of successive frames. Each object is assigned and embedded with a watermark. The watermark is embedded by generating the watermark, applying it to a perceptual (frequency) mask of the block, spatially (non-frequency) masking the resulting block, and re-adding the block to that spatially masked result. The objects are collected into a database so that an object may be tracked as it is transformed from frame to frame of the video host data. A unique watermark generation routine is also described that assists in the resolution of deadlock.

The approach of the invention provides advantages over the approaches found in the prior art. In the prior art, an independent watermark applied to each frame may result in detection of the watermark by statistically comparing or averaging similar regions and objects in successive video frames, as has been described in the background. However, the inventive object-based approach addresses this issue by embedding watermarks in objects that persist across frames. That is, the same watermark is embedded in the object, as that object exists from frame to frame. Therefore, statistical comparison or averaging does not yield the watermark.

Further aspects, advantages and embodiments of the invention will become apparent by reference to the drawings, and by reading the following detailed description.

DETAILED DESCRIPTION OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Overview of the Watermarking Process

Figure 1:
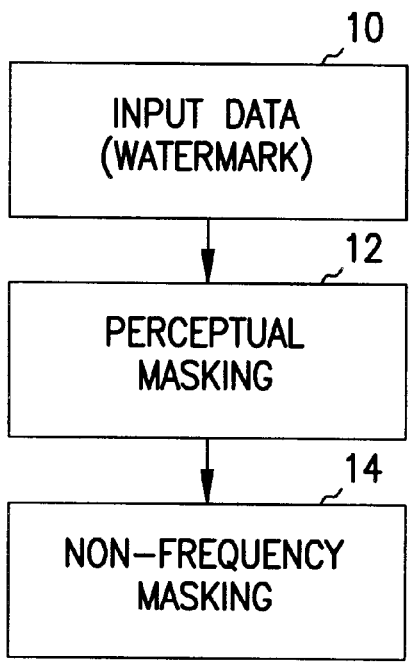
FIG. 1 is a flowchart of a method of a video watermarking process according to an embodiment of the invention.

Referring to FIG. 1, a flowchart of a method of a video watermarking process, according to one embodiment of the invention, is shown. Specifically, the method of FIG. 1 imbeds watermark data into host video data. The method of FIG. 1 is particularly used as to each defined object of the host video data, as that object persists across different frames of the video, as will be described in a following section. In step 10, the watermark data is generated, which is the signature, or watermark, that acts as a unique identifier for the host video data. Note that the signature inherently is spread across the frequency spectrum without explicit spread-spectrum processing.

In one embodiment of the invention, the signature is a pseudo-random sequence, which is created using a pseudo-random generator and two keys. With the two proper keys, the watermark may be extracted. Without the two keys, the data hidden in the video is statistically invisible and impossible to recover. Pseudo-random generators are well within the art. For example, the reference R. Rivest, "Cryptography," in *Handbook of Theoretical Computer Science* (J. van Leeuwen, ed.), vol. 1, ch. 13, pp. 717–755, Cambridge, Mass.: MIT Press, 1990, which is hereby incorporated by reference, describes such generators.

In one embodiment, the creation of the watermark data in step 10 works as follows. The author has two random keys x1 and x2 (i.e., seeds) from which the pseudo-random sequence y can be generated using a suitable cryptographic operator g(x1,x2), as known within the art. The noise-like sequence y, after some processing, is the actual watermark hidden into the video stream. The key x1 is author dependent. The key x2 is signal dependent. In particular, x1 is the secret key assigned to (or chosen by) the author. Key x2 is computed from the video signal which the author wishes to watermark. The signal dependent key is computed from the masking values of the original signal. The masking values give us tolerable error levels in the host video signal. The tolerable error levels are then hashed to a key x2.

The operator g( ) is called a pseudo-random sequence generator. For the pseudo-random generator to be useful, a pirate must not be able to predict bits of y or infer the keys x1 or x2 from knowledge of some bits of y. There are several popular generators that satisfy these properties, including RSA, Rabin, Blum/Micali, and Blum/Blum/Shub, as known within the art. For example, the Blum/Blum/Shub pseudo-random generator uses the one way function y=g(x)=x*x mod n, where n=pq for primes p and q so that p=q=3mod4. It can be shown that generating x or y from partial knowledge of y is computationally infeasible for the Blum/Blum/Shub generator. The classical maximal length pseudo noise sequence (i.e., m-sequence) generated by linear feedback shift registers are not used for this purpose. Sequences generated by shift registers are cryptographically insecure, as one can solve for the feedback pattern (i.e., the keys) given a small number of output bits y.

Thus, a pirate is not free to subtract off a second watermark y' arbitrarily. The pirate must supply the keys x1' and x2' which generate the watermark y' they wish to embed. It is computationally infeasible to invert the one-way function y'=g(x1',x2') to obtain x1' and x2'. Furthermore, x2' is not arbitrary. It is computed directly from the original video signal, which is inaccessible to the pirate. As a result, the two-key pseudo-random sequence author representation resolves the deadlock problem.

In step 12, the data generated by step 10 is imbedded into a perceptual mask of the host video data. The present invention employs perceptual masking models to determine the optimal locations within host data in which to insert the watermark. The perceptual mask is specific to video host data. The mask provides for the watermark data generated by step 10 to be embedded with the host data, at places typically imperceptible to the human eye. That is, the perceptual mask exploits masking properties of the human visual system. Step 12 embeds the watermark within the host data such that they will not be perceived by a human eye, as defined by the perceptual model. The perceptual masking of step 12 is conducted in the frequency domain.

Thus, image masking models based on the human visual system (HVS) are used to ensure that the watermark embedded into each video frame is perceptually invisible and robust. Visual masking refers to a situation where a signal raises the visual threshold for other signals around it. Masking characteristics are used in high quality low bit rate coding algorithms to further reduce bit rates. The masking models presented here are based on image models.

The masking models give the perceptual tolerance for image coefficients and transform coefficients. These masking models are also described in the reference B. Zhu, et al., "Low Bit Rate Near-Transparent Image Coding," in Proc. of the SPIE Int'l Conf. on Wavelet Apps. for Dual Use, vol. 2491, (Orlando, Fla.), pp. 173–184, 1995, which is hereby incorporated by reference, and in the reference B. Zhu, et al., "Image Coding with Mixed Representations and Visual Masking," in Proc. 1995 IEEE Int'l Conf. on Acoustics, Speech and Signal Processing, (Detroit, Mich.), pp. 2327–2330, 1995, which is also hereby incorporated by reference. The frequency masking model is based on the knowledge that a masking grating raises the visual threshold for signal gratings around the masking frequency. The model is based on the discrete cosine transform (DCT), expresses the contrast threshold at frequency f as a function of f, the masking frequency Em and the masking contrast cm:

$$c(f, f_m) = c_o(f) \cdot \text{Max}\{1, [f(f/f_m)c_m]^\alpha\},$$

where co(f) is the detection threshold at frequency f. To find the contrast threshold c(f) at a frequency f in an image, the DCT is first used to transform the image into the frequency domain and find the contrast at each frequency. Then, a summation rule of the form $$c(f) = [\Sigma f_m c(f, f_m)]^{1/\beta},$$

is used to sum up the masking effects from all the masking signals near f. If the contrast error at f is less than c(f), the model predicts that the error is invisible to human eyes.

In step 14, the host video data, with the imbedded watermark data, from step 12 is further subject to a non-frequency mask. Because the perceptual mask in step 12 is a frequency domain mask, a further mask is necessary to ensure that the embedded data remains invisible in the host video data. The non-frequency mask is a spatial mask.

Frequency masking effects are localized in the frequency domain, while spatial masking effects are localized in the spatial domain. Spatial masking refers to the situation that an edge raises the perceptual threshold around it. Any model for spatial masking can be used, and such models are well known in the art. However, the model used in one embodiment of the invention is similar to the model described in the Zhu, "Low Bit Rate . . . " reference previously incorporated by referenced, and which is itself based on a model proposed by Girod in "The Information Theoretical Significance of Spatial and Temporal Masking in Video Signals," in Proceedings of the SPIE Human Vision, Visual Processing, and Digital Display, vol. 1077, pp. 178–187 (1989), which is also herein incorporated by reference.

In one embodiment the upper channel of Girod's model is linearized under the assumption of small perceptual errors, the model giving the tolerable error level for each pixel in the image, as those skilled in the art can appreciate. Furthermore, under certain simplifying assumptions described in the Zhu "Bit Rate . . . " reference, the tolerable error level for a pixel p(x,y) can be obtained by first computing the contrast saturation at (x,y)

$$dc_{sat}(x, y) = dc_{sat} = \sqrt{\frac{T}{\sum_{x',y'} w_4(0, 0, x', y')}}$$

where the weight $w_4(x,y,x',y')$ is a Gaussian centered at the point (x,y) and T is a visual test based threshold. Once $dc_{sat}(x,y)$ is computed, the luminance on the retina, $dl_{ret}$, is obtained from the equation $$dc_{sat}(x,y) = w_2(x,y) \cdot dl_{ret}(x,y)$$

From $dl_{ret}$, the tolerable error level ds(x,y) for the pixel p(x,y) is computed from $$dl_{ret}(x,y) = w_1(x,y) \cdot ds(x,y)$$

The weights $w_1(x,y)$ and $w_2(x,y)$ are based on Girod's model. The masking model predicts that changes to pixel p(x,y) less than ds(x,y) introduce no perceptible distortion.

As have been described, steps 10, 12 and 14 of FIG. 1 provide an overview of the video watermarking process of the present invention. An overview of the object-based video watermarking process of the present invention is now described.

Overview of the Object-Based Video Watermarking Process

Figure 2:
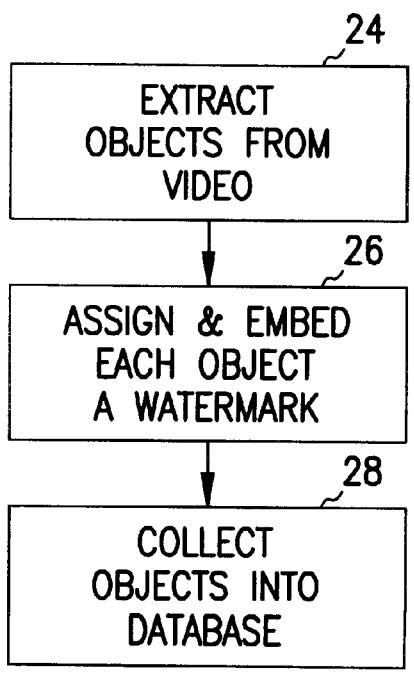
FIG. 2 is a flowchart of a method of an object-based video watermarking process according to an embodiment of the invention.

Referring to FIG. 2, a flowchart of a method of an object-based video watermarking process, according to one embodiment of the invention, is shown. The method utilizes the watermarking method of FIG. 1 already described. In step 24, a segmentation algorithm to extract objects from the host video data. The invention is not limited to a particular segmentation algorithm. Such segmentation algorithms are known in the art. For example, in one embodiment, the algorithm described in the reference E. Chalom and V. M. Bove, Jr., "Segmentation of an Image Sequence Using Multi-Dimensional Image Attributes," in Proc. 1996 IEEE Int'l Conf. on Image Processing, (Lausanne, Switzerland), pp. 525–528, 1996, which is hereby incorporated by reference, is used.

In step 26, each segmented object is embedded with a unique watermark according its perceptual characteristics. In particular, each object in the video has an associated watermark. As the object experiences translations and transformations over time, the watermark remains embedded with it. An interframe transformation of the object is estimated and used to modify the watermark accordingly. If the object is modified too much, or if the watermark exceeds the TEL of the object pixels, a new object and new watermark are defined.

In step 28, objects defined in the video are collected into an object database. As new frames are processed, segmented objects may be compared with previously defined objects for similarity. Objects which appear visually similar use the same watermark (subject to small modifications according to affine transformations). As a result, the watermark for each frame changes according to the perceptual characteristics while simultaneously protecting objects against statistical analysis and averaging.

The object-based video watermarking method of the invention has several other advantages. As it is object based, the algorithm may be easily incorporated into the MPEG-4 object-based coding framework, which is known within the art. In addition, the detection algorithm does not require information regarding the location (i.e., index) of the test frames in the video. Objects are simply identified in the test frames. Once objects are identified, their watermarks may be retrieved from the database and used to determine ownership.

A simplified block-based (MPEG) approach to the object watermarking method may be implemented. Rather than watermarking true objects with irregular boundaries, rectangular blocks are watermarked using a modified form of MPEG motion tracking. Specifically, frame-by-frame block tracking is performed in terms of translation, rotation, and scaling between the current reference block and candidate blocks in the next frame. Given a block in the current frame, an affine transformation vector is obtained by minimizing a cost function measuring the mismatch between the block and each predictor candidate.

Furthermore, the range of predictor candidates are limited by scale, rotation, and translation. The error corresponding to the best matching candidate is compared to a similarity threshold. Candidate blocks with mismatches less than the threshold are signed with identical watermarks. This MPEG approach is utilized in the specific implementation of the invention that will be shown in and described in conjunction with FIG. 4.

As have been described, steps 24, 26, and 28 of FIG. 2 provide an overview of the object-based watermarking process of the present invention. The specifics of the hardware implementation of the invention are now provided.

Hardware Implementation of the Invention

Figure 3:
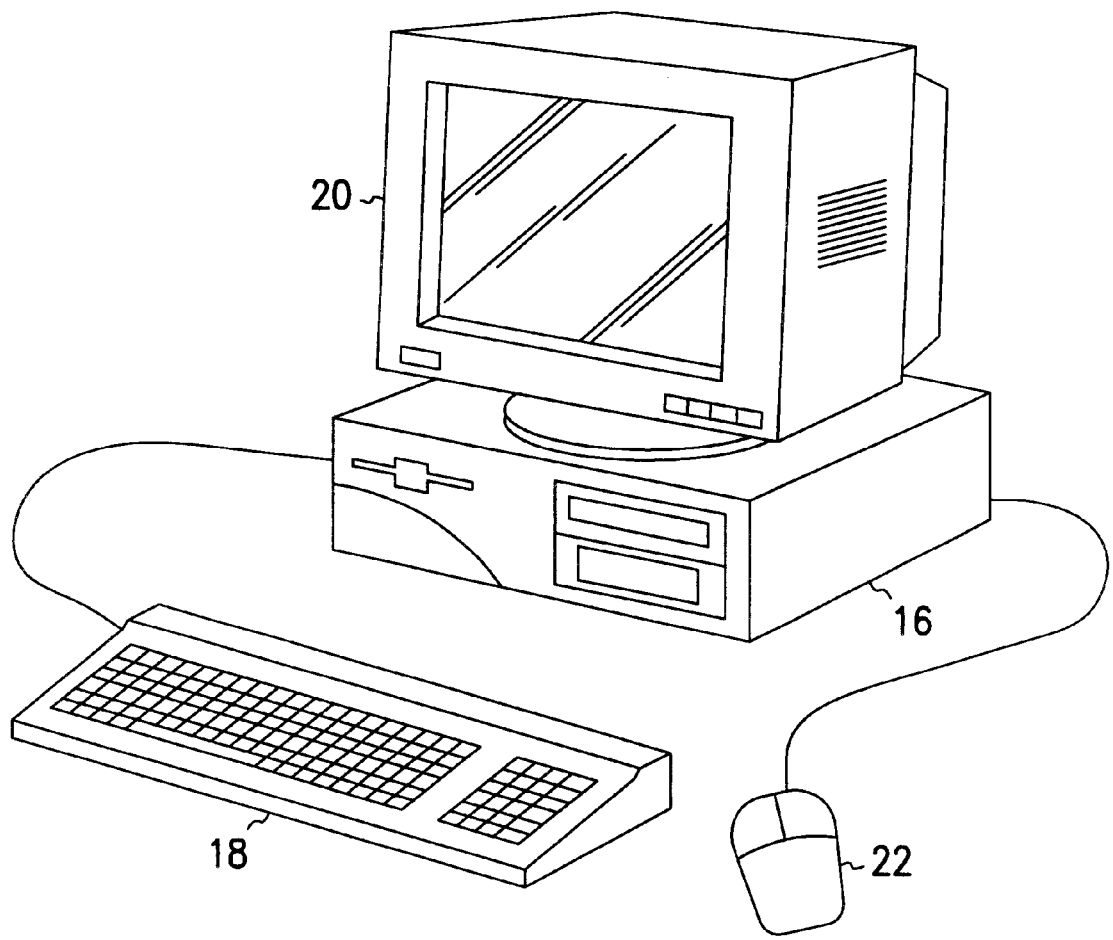
FIG. 3 is a diagram of a typical computer to be used with embodiments of the invention; and, FIG. 4 is a block diagram of a specific implementation of object-based video watermarking, based on the methods of FIG. 1 and FIG. 2, according to an embodiment of the invention.

The present invention is not limited as to the type of computer on which it runs. However, a typical example of such a computer is shown in FIG. 3. Computer 16 is a desktop computer, and may be of any type, including a PC-compatible computer, an Apple Macintosh computer, a UNIX-compatible computer, etc. Computer 16 usually includes keyboard 18, display device 20 and pointing device 22. Display device 20 can be any of a number of different devices, including a cathode-ray tube (CRT), etc. Pointing device 22 as shown in FIG. 3 is a mouse, but the invention is not so limited. Not shown is that computer 16 typically also comprises a random-access memory (RAM), a read-only memory (ROM), a central-processing unit (CPU), a fixed storage device such as a hard disk drive, and a removable storage device such as a floppy disk drive. The computer program to implement the present invention is typically written in a language such as C, although the present invention is not so limited.

The specifics of the hardware implementation of the invention have been described. A particular implementation of the object-based video watermarking of the invention, based on the methods of FIG. 1 and FIG. 2, is now described.

Particular Implementation of Object-Based Video Watermarking

Figure 4:
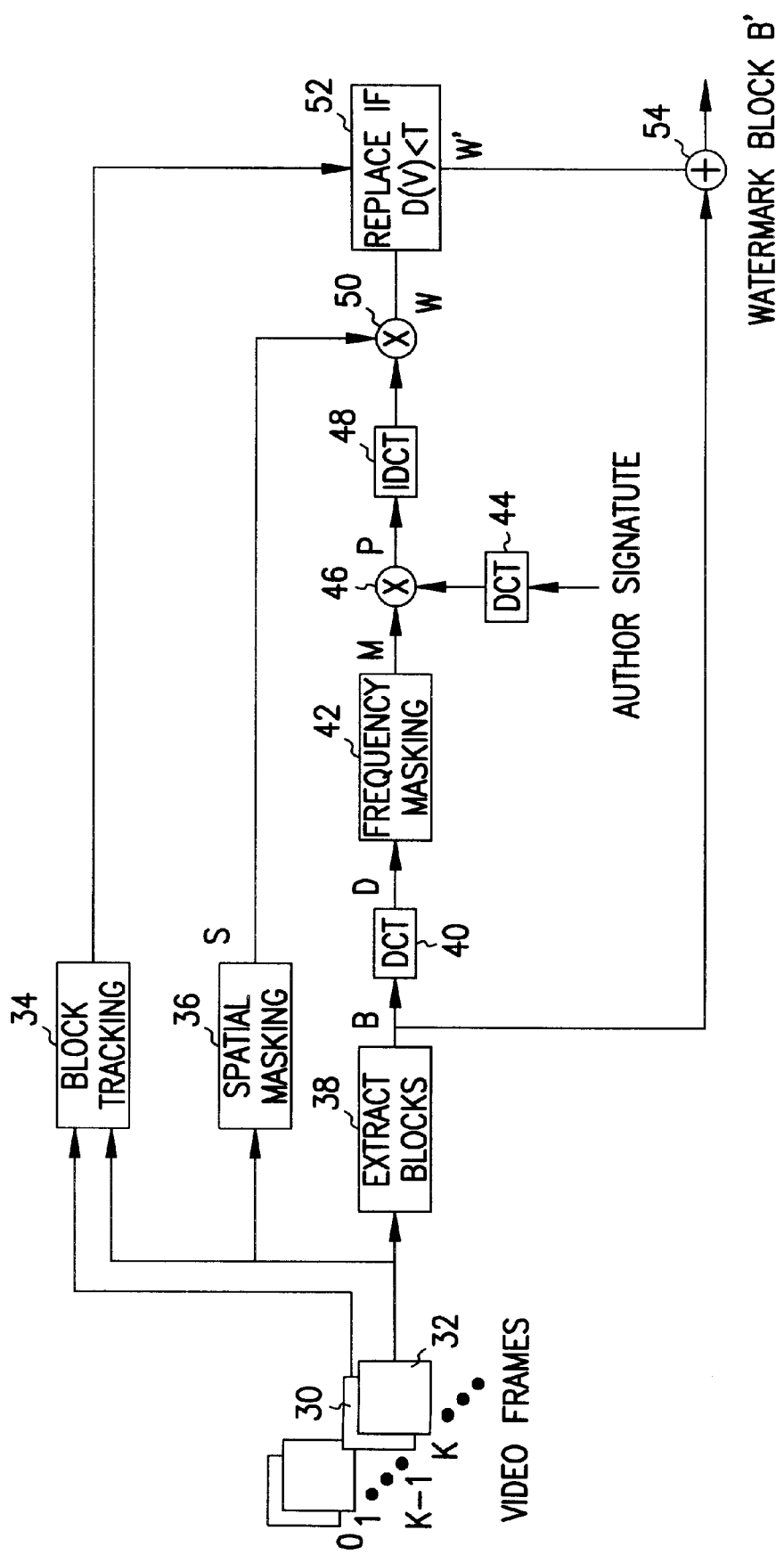

The embodiment shown in FIG. 4 illustrates a particular implementation of object-based video watermarking according to the invention, as based on the methods of FIG. 1 and FIG. 2 that have already been described. Referring now to FIG. 4, a block diagram of this specific implementation of object-based video watermarking is shown. A video frame k 32 is input into step 34 along with video frame k-1 30 (i.e., the video frame immediately preceding frame k 32. Video frame k 32 is also input into steps 36 and 38. The host video data is made up of a number of such frames.

In step 34, the individual blocks (that is, objects) between the two video frames are compared so that they may be tracked. The block-tracking algorithm used in one embodiment is that which has already been described in conjunction with FIG. 2, although the invention is not so limited. Specifically, it is a simplified MPEG block-based approach, using rectangular blocks in a modified form of MPEG motion tracking. Frame-by-frame block tracking is performed in terms of translation, rotation, and scaling between in the current reference block from frame k-1 30 and candidate blocks in the frame k 32. Given a block in the frame k-1 30, an affine transformation vector is obtained by minimizing a cost function measuring the mismatch between the block and each predictor candidate. The range of predictor candidates is limited by scale, rotation, and translation.

In step 36, the spatial masking value S for frame k 32 is computed. The spatial masking value S will be introduced into the frequency mask later to verify that the watermark designed with the frequency masking model is invisible for local spatial regions. The invention is not limited to any particular spatial mask. One particular spatial mask for video host data is that which has already been described in conjunction with FIG. 1. Each watermark coefficient may also be compared with the tolerable error level obtained to assure that it is invisible.

In step 38, the image data within frame k 32 is segmented into blocks. The invention is not limited to any particular manner by which the data is segmented. In one embodiment, the image data is segmented as has already been described in conjunction with FIG. 2. Using a traditional approach, the blocks may be n×n (e.g., 8×8 like JPEG). An option at this stage is to segment the image data of the frame into blocks of objects and texture regions, or square blocks of data. Blocking the image adds detection robustneses to cropping and localized signal processing.

In step 40, a discrete cosine transform (DCT) is applied to each block B of the frame k 32, to obtain the DCT coefficients D of the blocks B. This transforms the data into the frequency domain, where perceptual masking is conducted. In step 42, a perceptual frequency mask is computed for each block. The perceptual mask according to the invention takes into account the human visual system so that the watermark is embedded within the host data in a manner that makes the watermark invisible within the host data. The invention is not limited to any particular perceptual mask; however, the frequency mask described in conjunction with FIG. 1 may be used. Note that segmenting the frame into blocks ensures that the frequency masking estimates are localized.

In step 44, the unique signature, or watermark, for each block, is also transformed into the frequency domain by DCT. The signature can be of any type, such as that has been described in conjunction with FIG. 1, a pseudo-noise (PN) code, etc. In particular, the signature may be a type of PN code known as an m-sequence. Note that a different signature sequence is used for each image block B. In step 46, the resulting mask of step 42 of the image block B is scaled (multiplied) into the DCT of the signature for the image block resulting from step 44, to obtain the product P. The resulting signature-laden block is then transformed back to the time domain via an inverse DCT (IDCT) in step 48. In step 50, the spatial masking values S for the frame k resulting from step 36 is then scaled (multiplied) into the IDCT'ed block resulting from step 48, to obtain block W.

In step 52, the watermark for a block in the current frame k 32 is replaced with the watermark for the block from the previous frame k-1 30 if the distortion D(V) is less than a threshold T. That is, the error corresponding to the best matching candidate from step 34 for each block B is compared to a similarity threshold T. Candidate blocks with mismatches less than the threshold T are signed with identical watermarks (from the block B in frame k-1 30). The result from step 52 is block W'. Finally, in step 54, the watermarked mask resulting from the previous steps (most immediately step 52) is added to the corresponding extracted block B resulting from step 38, to obtain block B'. The watermarked frame is then obtained by assembling the blocks of each frame.

The watermarks embedded within the video data according to the method of FIG. 4 should be extractable even if common signal processing operations are applied to the host data. This is particularly true in the case of deliberate unauthorized attempts to remove the watermark. For example, a pirate may attempt to add noise, filter, code, re-scale, etc., the host data in an attempt to destroy the watermark. The embedded watermark, however, is noise-like and its location over multiplied blocks of the host data, over successive frames of the data, is unknown. Therefore, the pirate has insufficient knowledge to directly remove the watermark. Furthermore, a different signature is used for each block to further reduce unauthorized watermark removal by cross correlation. Any destruction attempts are done blindly.

Detection of the watermark is accomplished via generalized likelihood ratio test. For a frame or object R in the potentially pirated video sequence, the hypothesis test H0: X=R−F=N (no watermark)

H1: X=R−F=W'+N (watermark)

is performed. Here F may be an original frame closest to R or may be a composite frame of objects from the object database. In the case when R is an object, F is the corresponding object from the object database. The term W' is the potentially modified watermark, and N is noise. The hypothesis decision is obtained by measuring the similarity between the extracted signal X and original watermark W of F: Sim(X,W)=X'*W/(W*W), and comparing with a threshold. Similarity greater than a minimum threshold indicates the presence of the owner's watermark (and copyright).

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. A computerized method for embedding data representing a watermark into host data relating to video:

generating the data representing the watermark;

embedding the data into the host data in accordance with a perceptual mask conducted in the frequency domain; and, subjecting the host data, including the data embedded therein, to a non-frequency mask.

2. The computerized method of claim 1, wherein the data representing the watermark comprises a pseudo-random sequence.

3. The computerized method of claim 1, wherein generating the data representing the watermark uses a pseudo-random generator and two keys to generate the data.

4. The computerized method of claim 3, wherein the pseudo-random generator is selected from the group comprising RSA, Rabin, Blum/Micali, and Blum/Blum/Shub.

5. The computerized method of claim 1, wherein the perceptual mask comprises a model in which a contrast threshold at a frequency f is expressed as a function of the frequency f, a masking frequency $f_m$ and a masking contrast $c_m$, $$c(f,f_m)=c_o(f)\cdot\text{Max}\{1,[f(f/f_m)c_m]^\epsilon\},$$

where $c_o(f)$ is a detection threshold at the frequency f.

6. The computerized method of claim 1, wherein the non-frequency mask comprises a spatial mask.

7. A computerized system for watermarking host data relating to video comprising:

a processor;

a computer-readable medium;

computer-executable instructions executed by the processor from the computer-readable medium comprising:
segmenting a video frame of the video into blocks;
applying a discrete cosine transform (DCT) to each block to generate a frequency block corresponding to the block;
applying a perceptual mask to each frequency block;
applying the DCT to a watermark for each frequency block;
scaling each frequency block, as to which the perceptual mask has been applied, by the watermark for frequency block, to which the DCT has been applied, to generate an scaler block corresponding to the frequency block;
applying an inverse DCT to each scaler block to generate a time-domain block corresponding to the frequency block to which the scalar block corresponds;
scaling each time-domain block by a spatial mask; and,
adding each time-domain block as scaled by the spatial mask with the block having a corresponding frequency block to which the time-domain block corresponds.

8. The computerized system of claim 7, further comprising before segmenting a video frame of the video into blocks:
tracking blocks of the video by comparing the blocks of the video frame with corresponding blocks of a second video frame of the video immediately preceding the video frame.

9. The computerized system of claim 7, further comprising after scaling each time-domain block by a spatial mask:
determining a distortion level;
replacing the watermark for a block in the video frame with a watermark for the block from a second video frame of the video immediately preceding the video frame upon determining the distortion level as less than a predetermined threshold.

10. A computer-readable medium having a computer program stored thereon to cause a suitable equipped computer to perform a method comprising:
segmenting a video frame of the video into blocks;
applying a discrete cosine transform (DCT) to each block to generate a frequency block corresponding to the block;
applying a perceptual mask to each frequency block;
applying the DCT to a watermark for each frequency block;
scaling each frequency block, as to which the perceptual mask has been applied, by the watermark for frequency block, to which the DCT has been applied, to generate an scaler block corresponding to the frequency block;
applying an inverse DCT to each scaler block to generate a time-domain block corresponding to the frequency block to which the scalar block corresponds;
scaling each time-domain block by a spatial mask;
determining a distortion level;
replacing the watermark for a block in the video frame with a watermark for the block from a second video frame of the video immediately preceding the video frame upon determining the distortion level as less than a predetermined threshold; and,
adding each time-domain block with the block having a corresponding frequency block to which the time-domain block corresponds.

11. The computer-readable medium of claim 10, wherein the computer-readable medium is a floppy disk.

* * * * *

UNITED STATES PATENT AND TRADEMARK OFFICE
CERTIFICATE OF CORRECTION

PATENT NO. : 6,282,299 B1
DATED : August 28, 2001
INVENTOR(S) : Ahmed H. Tewfik, Mitchell D. Swanson, Bin Zhu It is certified that error appears in the above-identified patent and that said Letters Patent is hereby corrected as shown below:

Column 1,
Line 25, delete "AF/F49620-93-1-05" and insert -- AF/F49620-93-1-0558 --, therefor.

Column 4,
Line 45, delete "Em" and insert -- fm --, therefor.

Signed and Sealed this

Second Day of April, 2002

Attest:

JAMES E. ROGAN
Attesting Officer      Director of the United States Patent and Trademark Office